United States Patent Office 3,504,413
Patented Apr. 7, 1970

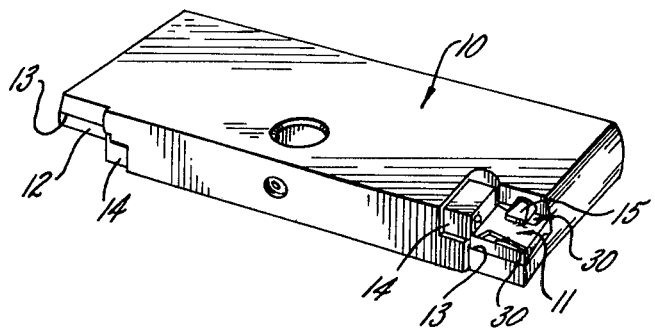
Fig. 1.
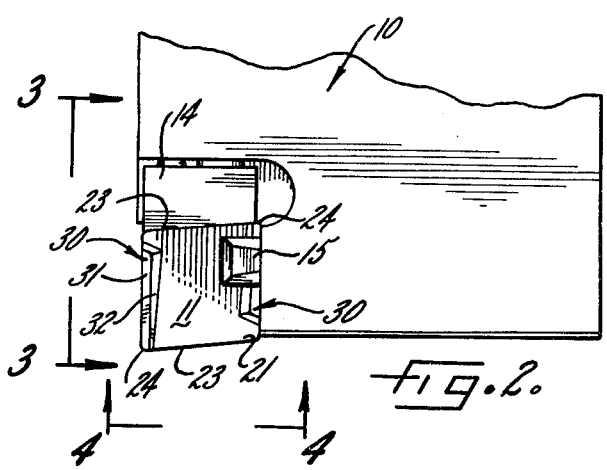
Fig. 2.
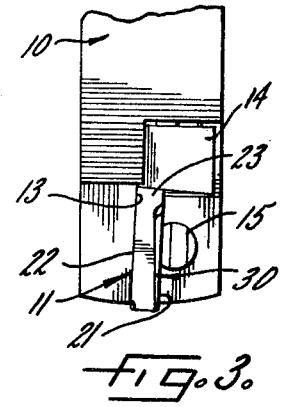
Fig. 3.
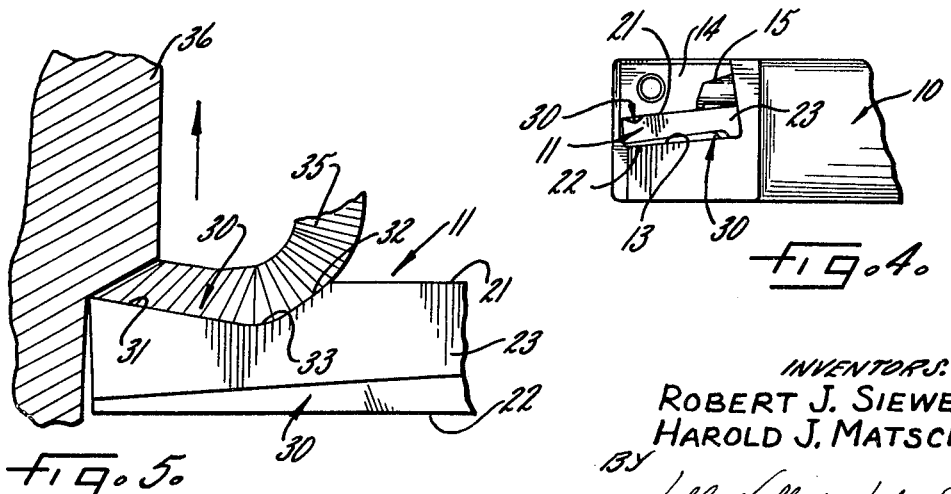
Fig. 4.
Fig. 5.
INVENTORS:
ROBERT J. SIEWERT
HAROLD J. MATSCHE, JR.
BY
Wolf, Hubbard, Voit & Osann
ATTORNEYS.

3,504,413
CUTTING BLADES FOR BLOCK-TYPE
CUTTING TOOLS
Robert J. Siewert and Harold J. Matsche, Jr., Fond du Lac, Wis., assignors to Giddings & Lewis, Inc., Fond du Lac. Wis., a corporation of Wisconsin
Filed Apr. 28, 1969, Ser. No. 819,720
Int. Cl. B26d 1/00
U.S. Cl. 29—96                                3 Claims

ABSTRACT OF THE DISCLOSURE

A solid cutting blade of the carbide insert type having grooves in its cutting face surfaces formed for creating positive axial and radial rake angles together with properly disposed chipbreaker surfaces when the blade is mounted in a negative rake block-type tool. Multiple grooves are provided so as to give multiple cutting faces on the same blade.

DESCRIPTION OF THE INVENTION

This invention relates to metal cutting blades of the kind used with block-type boring tools, and more particularly concerns a blade for converting a negative geometry cutting relationship to a positive geometry cutting relationship.

In U.S. Patent No. 3,295,187, issued Jan. 3, 1967 to Plummer there is shown a cutting tool for a boring bar utilizing replaceable carbide cutting blades or inserts. Blades of this kind are slightly parallelogram-shaped with parallel top and bottom surfaces. However, the boring tool pockets supporting the blades for cutting are shaped so that they incline both radially and axially of the spindle which drives the tool for boring. This gives the cutting faces of the blades negative rake angles both radially and axially (see FIGS. 4 and 5, respectively, of Patent No. 3,295,187).

This so-called negative geometry is effective for cutting hard steels and cast iron, but mild steel tends to weld onto a negative geometry cutting blade unless rather high surface speeds and feed rates are maintained. Mild steel cannot be effectively machined with a negative geometry blade at the same speeds and feeds as are used for hard steels.

While it is common to specify higher surface speeds and feed rates for machining mild steel to avoid welding, often a workpiece will not permit high-speed machining, or if the workpiece could withstand the heavier loads, the machine tool itself will not have sufficient horsepower to satisfactorily handle the job.

Accordingly, it is the aim of the invention to provide an insert-type cutting blade for giving a negative geometry boring tool a positive geometry cutting face. In this way, mild steels and the like can be effectively machined at moderate surface speeds and feed rates.

It is also an object of the invention to provide a compact blade of the above type having a plurality of alternately usable cutting faces.

A further object is to provide a blade of the above character which produces a chipbreaker which directs chips so that they neither abrade the boring tool nor scratch the workpiece surface finish.

Other objects and advantages of the invention will become apparent upon reading the following detailed description and upon reference to the drawings, in which:

FIGURE 1 is a perspective of a tool embodying the invention;

FIG. 2 is a fragmentary elevation of a portion of the tool shown in FIG. 1;

FIG. 3 is a fragmentary elevation taken along the line 3—3 of FIG. 2;

FIG. 4 is a fragmentary elevation taken along the line 4—4 of FIG. 2; and

FIG. 5 is an enlarged fragmentary view, similar to FIG. 4, showing the blade of the invention cutting a chip from a workpiece.

While the invention will be described in connection with a preferred embodiment, it will be understood that we do not intend to limit the invention to that embodiment. On the contrary, we intend to cover all alternatives, modifications and equivalents as may be included within the spirit and scope of the invention.

Turning to FIG. 1, there is shown a block-type cutting tool 10 of the kind intended to be mounted in a boring bar that is driven by a machine tool spindle. The tool cutting elements are blades 11 and 12 embodying the invention and being mounted in pockets 13 at each end of the tool 10.

The tool 10 is of the kind shown in Patent No. 3,295,187, referred to above, and it includes adjusting shoes 14 for positioning the blades 11, 12 and a clamp member 15 for each blade for holding the blades in position. The bottom surfaces of the pockets 13 are angled to negative radial and axial rake angles, as can be best seen in FIGS. 3 and 4, respectively. Thus, with the usual type of flat surface blades, the cutting surfaces defined by the inserts mounted in the pockets 13 would have negative rake angles.

Like the usual type of blade, the blades 11, 12 are formed of solid cutting material, normally sintered carbide, with parallel upper and lower surfaces 21 and 22, and flat sides 23. The surfaces 21, 22 are slightly parallelogram-shaped so as to define acute angle corners 24 (see FIG. 2) which are the cutting tips of the blade. Preferably, the acute angles 24 are on the order of 86°, so that the blades 11, 12 are only slightly out-of-square. The very tips of the corners are slightly rounded.

In accordance with the invention, grooves 30 are formed in the surfaces 21, 22 running from each acute angle corner 24 along an adjacent edge, and the grooves 30 are defined by a cutting face 31 sloping down from the adjacent edge and down from the acute angle corner so that, when the blade is placed in a pocket 13, the cutting face 31 is disposed at a positive radial and axial rake angle. The slope of the cutting face 31 from the adjacent edge to give a positive axial rake angle is shown in FIGS. 4 and 5, while the slope from the acute angle corner 24 to give a positive radial rake angle is shown best in FIG. 3. Optimum positive rake angles for machining mild steel range between 0 and 5°. Preferably, the grooves 30 end short of the opposite end of the edge along which they run so that the obtuse angle corners of the block are not weakened by the deeper portions of the superimposed grooves. The positive radial rake angle provided by the insert affords optimum chip flow direction. This disposition prevents chips from abrading the tool 10 and from being directed radially so as to scratch or otherwise mar the surface being bored.

In carrying out the invention, the grooves 30 are also defined by a chipbreaker surface 32 extending from the cutting face 31 to the surface 21 or 22 in which the groove is formed. The chipbreaker surface 32 is preferably disposed at an angle of about 35° with respect to the adjacent one of the surfaces 21, 22, and is positioned parallel to the edge of the cutting face 31. This disposition gives uniform chip breaking performance along the full length of the cutting surface.

It has also been found desirable to join the cutting face 31 and the chipbreaker surface 32 of each groove 30 with a short radius cylindrical surface 33 (see FIG. 5). The radius of the surface 33 is preferably on the order of 0.02 to 0.03 inch. Too small a radius tends to produce welding of the workpiece chip. Too large a radius reduces the abruptness of chip flow direction change produced by the chipbreaker and would result in unbroken chips.

One of the problems found in attempts to utilize prior tools in tool holders of the type described in said patent, was in obtaining effective disposal of chips formed at the cutting edge in both heavy and shallow depths of cut. The structure of the tool of this invention provides a chipbreaker near the extreme outer edge and extending for substantially the full length of the cutting surface. This chipbreaker is effective to direct chip flow away from the tool holder and the cutting surface, and out of the bore, so that the chips do not abrade the tool holder or the cutting surface, and thus effectively disposes chips even while taking shallow or finishing cuts.

As will be apparent, placing the blades 11, 12 in the pockets 13 converts the tool from a negative geometry cutting relationship to a positive geometry relationship. The blades are adjusted and held in the tool 10 just as described in above-referred-to Patent No. 3,295,187. Each blade provides multiple cutting faces. Use of the blades 11, 12 gives added versatility to machine tools using the tool 10.

We claim as our invention:

1. A cutting blade for a block-type boring tool having a blade pocket angled at negative radial and axial rake angles, comprising a solid made of cutting material with parallel upper and lower surface and flat sides, said upper and lower surfaces being slightly parallelogram-shaped, said surfaces having grooves running from each acute angle corner of said parallelogram along an adjacent edge, said grooves ending short of the opposite end of said edge, said grooves being defined by a generally flat cutting face sloping down from said adjacent edge and down from said acute angle corner so that, when placed in said negative angle pocket, the cutting face is disposed at a positive radial and aixal rake angle, said grooves also being defined by a chipbreaker surface extending from said cutting face to the surface in which the groove is formed, and said cutting face and chipbreaker surface being joined by a short radius cylindrical surface.

2. The blade of claim 1 in which said chipbreaker surface parallels the edge of said cutting face and is effective for both light and heavy stock removal cuts.

3. The blade of claim 1 in which said acute angle corners define angles of about 86° and said chipbreaker surface is disposed at approximately a 35° angle with respect to the surface in which the groove is formed.

References Cited

UNITED STATES PATENTS

| | | | |
|---|---|---|---|
| 2,641,048 | 6/1953 | Vreeland | 29—95 |
| 2,870,523 | 1/1959 | Richard | 29—96 |
| 3,097,417 | 7/1963 | Hill | 29—96 |
| 3,137,917 | 6/1964 | Dowd | 29—95 |

HARRISON L. HINSON, Primary Examiner

U.S. Cl. X.R.

29—95, 105; 77—58